(12) United States Patent
Hamilton

(10) Patent No.: US 7,058,829 B2
(45) Date of Patent: Jun. 6, 2006

(54) METHOD AND APPARATUS FOR A COMPUTING SYSTEM HAVING AN ACTIVE SLEEP MODE CPU THAT USES THE CACHE OF A NORMAL ACTIVE MODE CPU

(75) Inventor: Tony G. Hamilton, Durham, NC (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 10/219,413

(22) Filed: Aug. 14, 2002

(65) Prior Publication Data

US 2004/0034802 A1    Feb. 19, 2004

(51) Int. Cl.
G06F 1/32    (2006.01)
(52) U.S. Cl. ............... 713/320; 713/300; 713/323; 713/324
(58) Field of Classification Search ............ 713/300, 713/320, 323, 324
See application file for complete search history.

(56) References Cited

U.S. PATENT DOCUMENTS

| | | |
|---|---|---|
| 5,432,462 A | 7/1995 | Obregon et al. |
| 5,860,016 A | 1/1999 | Nookala et al. |
| 5,936,442 A | 8/1999 | Liu et al. |
| 5,959,833 A | 9/1999 | Youens |
| 5,983,073 A | 11/1999 | Ditzik |
| 5,983,186 A | 11/1999 | Miyazawa et al. |
| 6,052,792 A | 4/2000 | Mensch, Jr. |
| 6,098,175 A | 8/2000 | Lee |
| 6,131,166 A | 10/2000 | Wong-Insley |
| 6,222,507 B1 | 4/2001 | Gouko |
| 6,240,521 B1 * | 5/2001 | Barber et al. ........... 713/323 |
| 6,289,464 B1 | 9/2001 | Wecker et al. |
| 6,341,354 B1 | 1/2002 | Lee |
| 6,385,734 B1 | 5/2002 | Atkinson |
| 6,424,249 B1 * | 7/2002 | Houvener ........... 340/5.82 |
| 6,445,730 B1 | 9/2002 | Greszczuk et al. |

(Continued)

FOREIGN PATENT DOCUMENTS

EP    0 945 778 A2    9/1999

(Continued)

OTHER PUBLICATIONS

Compaq/Intel/Microsoft/Phoenix and Toshiba, "Advanced Configuration and Power Interface Specification", Revision 2.0a, Mar. 31, 2002, Relevant Sections 2.2-2.6 (pp. 219-224), 3.2-3.4.4 (pp. 27-32), 4.3 (pp. 50-54) and 4.7.2.3 (p. 67).

(Continued)

Primary Examiner—Chun Cao
Assistant Examiner—Vincent Tran
(74) Attorney, Agent, or Firm—Blakely, Sokoloff, Taylor & Zafman LLP

(57) ABSTRACT

A method is described that involves storing active sleep mode software instructions to be executed by a low end central processing unit into an on chip cache that caches normal active mode software instructions executed by a high end central processing unit. The active sleep mode software instructions are to be executed by the low end central processing unit during an active sleep mode. The normal active mode software instructions are executed by the high end central processing unit during a normal active mode. The active sleep mode consumes less power than the normal active mode.

14 Claims, 13 Drawing Sheets

U.S. PATENT DOCUMENTS

| | | | |
|---|---|---|---|
| 6,502,003 B1 | 12/2002 | Jacobs et al. | |
| 6,535,985 B1* | 3/2003 | Oshima et al. | 713/323 |
| 6,631,474 B1* | 10/2003 | Cai et al. | 713/300 |
| 6,658,576 B1* | 12/2003 | Lee | 713/320 |
| 6,675,233 B1 | 1/2004 | Du et al. | |
| 6,680,738 B1 | 1/2004 | Ishii et al. | |
| 6,697,953 B1 | 2/2004 | Collins | |
| 6,725,060 B1 | 4/2004 | Chhatriwala et al. | |
| 6,751,742 B1 | 6/2004 | Duhault et al. | |
| 6,760,850 B1 | 7/2004 | Atkinson et al. | |
| 6,785,786 B1* | 8/2004 | Gold et al. | 711/162 |
| 6,801,208 B1* | 10/2004 | Keshava et al. | 345/557 |
| 6,801,974 B1 | 10/2004 | Watts et al. | |
| 6,803,810 B1 | 10/2004 | Yamada et al. | |
| 6,804,791 B1 | 10/2004 | Oshima et al. | |
| 6,835,850 B1 | 12/2004 | Drent et al. | |
| 6,836,850 B1* | 12/2004 | Cheng | 713/324 |
| 6,848,047 B1 | 1/2005 | Hicok | |
| 6,895,448 B1 | 5/2005 | Chan et al. | |
| 2002/0023237 A1 | 2/2002 | Yamada et al. | |
| 2002/0068610 A1 | 6/2002 | Anvekar et al. | |
| 2002/0085835 A1 | 7/2002 | Zhang et al. | |
| 2002/0086719 A1 | 7/2002 | Kedia et al. | |
| 2002/0129288 A1* | 9/2002 | Loh et al. | 713/320 |
| 2002/0173344 A1 | 11/2002 | Cupps et al. | |
| 2002/0178390 A1 | 11/2002 | Lee | |
| 2003/0208550 A1 | 11/2003 | Hamilton | |

FOREIGN PATENT DOCUMENTS

| | | |
|---|---|---|
| EP | 1 221 645 A2 | 7/2002 |
| WO | WO 01/61442 A1 | 8/2001 |

OTHER PUBLICATIONS

Copy of Office Action for Related Case U.S. Appl. No. 10/219,508, filed on Aug. 14, 2002, 11 pgs.

Copy of Current Claims for Related Case U.S. Appl. No. 10/219,508, filed on Aug. 14, 2002, 6 pgs.

* cited by examiner

METHOD AND APPARATUS FOR A COMPUTING SYSTEM HAVING AN ACTIVE SLEEP MODE CPU THAT USES THE CACHE OF A NORMAL ACTIVE MODE CPU

FIELD OF THE INVENTION

The field of invention relates generally to computing systems; and, more specifically, to a method and apparatus for a computing system having an active sleep mode.

BACKGROUND

FIG. 1 shows an exemplary depiction of a computing system 100. According to the computing system design of FIG. 1, a central processing unit (CPU) 101 (such as a microprocessor) is used to execute instructions that effectively perform the software routines that are executed by the computing system 100. The computing system also includes a graphics controller (which may also be referred to as a display controller) 104 that provides digital information (e.g., in the form of bytes of digital data or "words" of digital data that are wider than 8 bits) to a display unit 105.

The display unit 105 is designed to transform the stream of digital information provided by the graphics controller 104 into orchestrated analog signals that, when applied to a display device (such as a liquid crystal display device or a thin film transistor display device), result in the appearance of visual subject matter (e.g., a graphical user interface (GUI)) on the display unit 105. The graphics controller 104 is typically designed to perform numerically intensive functions (e.g., that are used to display fluid motions on the display device) so as to offload from the CPU 101 the burden of performing these functions.

In the embodiment of FIG. 1, a memory controller and bridge unit 102 is coupled to both the graphics controller 104 and the CPU 101. The memory controller and bridge unit 102 may be implemented, for example, with a pair of semiconductor chips (e.g., a memory controller chip; and, a bridge chip) or a single semiconductor chip. The bridge portion of the memory controller and bridge unit 102 effectively acts as a gateway that allows other "I/O components" $107_1$ through $107_N$ (e.g., a disk drive, a CD read only memory (ROM), a networking interface, a diskette drive, a card interface, etc.) to store information into (or retrieve information from) the system memory 103. Typically, the I/O components share a bus 106 (e.g., a PCI bus) to which the bridge portion of the memory controller and bridge unit 102 is also coupled.

The bus 106 provides an efficient mechanism for sending information between the system memory 103 and the I/O components $107_1$ through $107_N$ because each I/O component uses common signal wiring from which the bus 106 is constructed. The bridge portion of the memory controller and bridge unit 102 may translate between a pair of buses (e.g., bus 106 and a second bus (not shown in FIG. 1) that acts as a third input/output port to the memory controller portion of the memory controller and bridge unit 102); or, may simply provide a third/input output port to the memory controller portion of the memory controller and bridge unit 102.

The memory controller portion of the memory controller and bridge unit 102 effectively controls the reading and writing signaling activity (e.g., addressing signals) applied to the system memory 103. Here, as both the CPU 101 and the various I/O components $107_1$ through $107_N$ may invoke the services of the system memory 103 (e.g., in the case of the CPU 101, for reading instructions or reading/writing data; or, in the case of an I/O component, for forwarding data that will be worked upon by the computing system's software), the memory controller portion of the memory controller and bridge unit 102 may effectively arbitrate or otherwise resolve the contention for the system memory's data storage services that may arise between the various I/O components $107_1$ through $107_N$ and the CPU 101. To the extent that the graphics controller 104 invokes use of the system memory 103, the memory controller portion of the memory controller and bridge unit 102 may also arbitrate its demands as well.

It is important to point out that other computing system embodiments are possible; and, as such, the term computing system, computer and the like are not to be construed as automatically limited to the exemplary architecture that has been depicted in FIG. 1. Some exemplary alternative computing system embodiments might entail: 1) coupling the graphics controller 104 to the processor 101 rather than the memory controller and bridge unit 102; 2) not having a graphics controller 104 (e.g., such that the numerically intensive graphical calculations are performed by the CPU 101); 3) not having an external (off-chip) cache 108 relative to the CPU 101; etc. Note that the combination of the CPU 101, memory controller 102 and system memory 103 (and display controller 104 and external cache 108 if they are implemented) may be referred to as the processing core 109 of the computing system 109.

Mobile computing systems such as laptop computers, notebook computers, handheld devices (e.g., personal digital assistants, cellphones, IEEE 802.11 based devices, etc.) are often battery powered; and, as such, power consumption is a matter of concern. Typically, the less power consumed by a mobile computing system, the longer the life of the battery that powers the computing system. Often, mobile computing systems are built with a "sleep mode" and/or a "hibernation mode". Either of these modes substantially shut down the activity of the computing system so that battery power is conserved.

In "sleep mode" the computing system's "appendages" outside the processing core 109 (e.g., its display unit 105, one or more I/O components $107_1$ through $107_N$) are shut down while its volatile memory within the processing core 19 (e.g., the external cache 108, the system memory 103, etc.) is kept awake (e.g., by continuing to clock/refresh and/or otherwise apply power to the cache and the system memory 103). The CPU 101 may also shut down various internal units so that the processing of application software effectively ceases. Sleep mode allows the system to conserve battery power consumption (because of the shut down of the appendages and internal CPU units) and also allows the computing system to rapidly awake because its volatile memory was never shut down.

In "hibernation mode" the contents of the volatile memory (e.g., cache and system memory) are first stored to non volatile memory (e.g., a disk drive); and then, the entire system is effectively shut down. Here, typically, greater power savings are realized as compared to the sleep mode because the volatile memory units are shut down. However, it takes longer for the system to return from hibernation mode to its original, normal, active state because the "state" of the system software at the time hibernation mode was entered (as represented by the matter that was transferred from volatile to non volatile memory) needs to be "reloaded" back into volatile memory (e.g., by reading the state data from the disk drive and re-storing it back to its original locations in cache and system memory 103).

Unfortunately, during either sleep mode or hibernation mode, the utility of a mobile computing system is effectively non existent because the CPU (being shut down) lacks the ability to execute a variety of instructions. That is, useful software routines (such as email retrieval, downloading information from the internet, etc.) cannot be executed.

DETAILED DESCRIPTION

Figure 1:
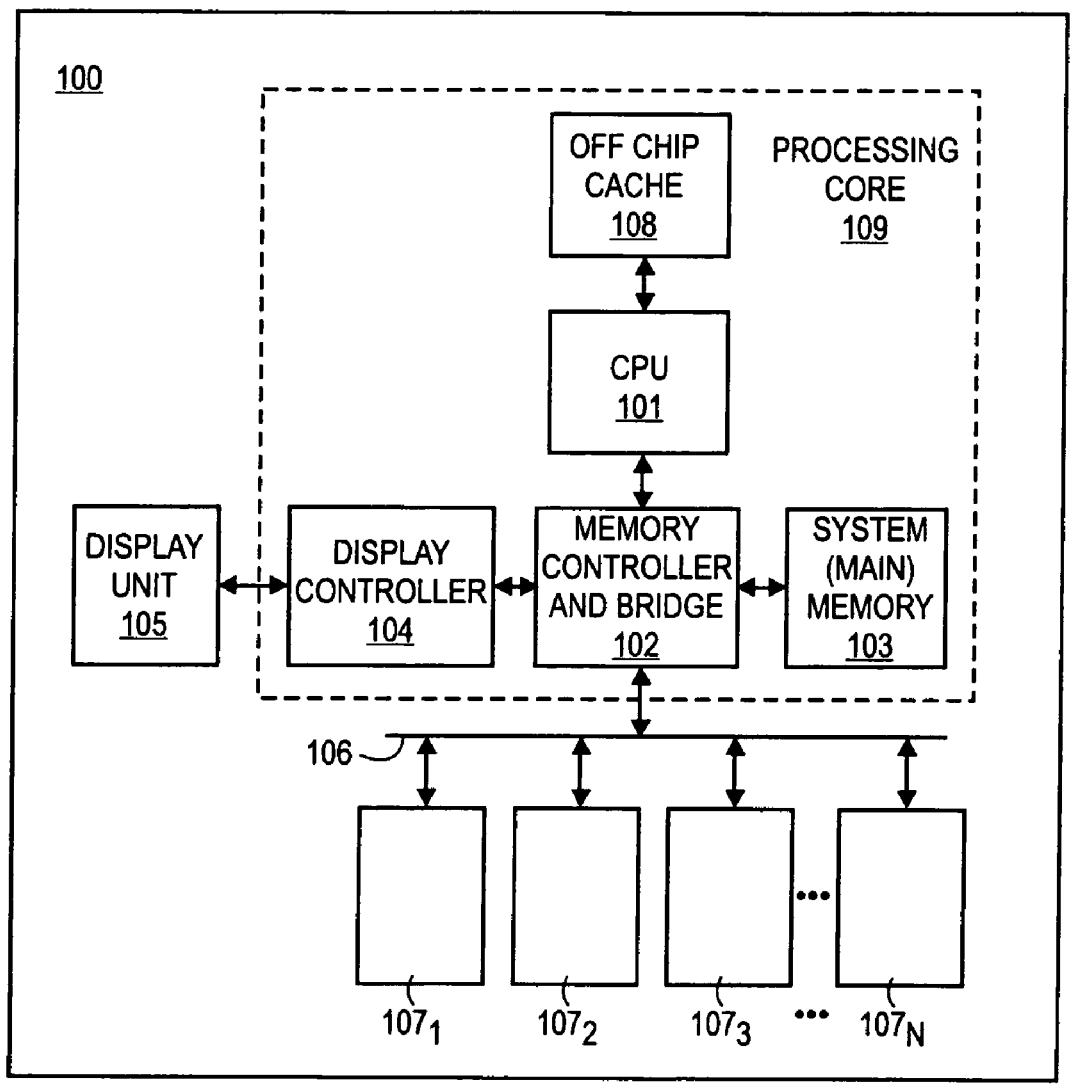
FIG. 1 shows an exemplary computing system.
Figure 2A:
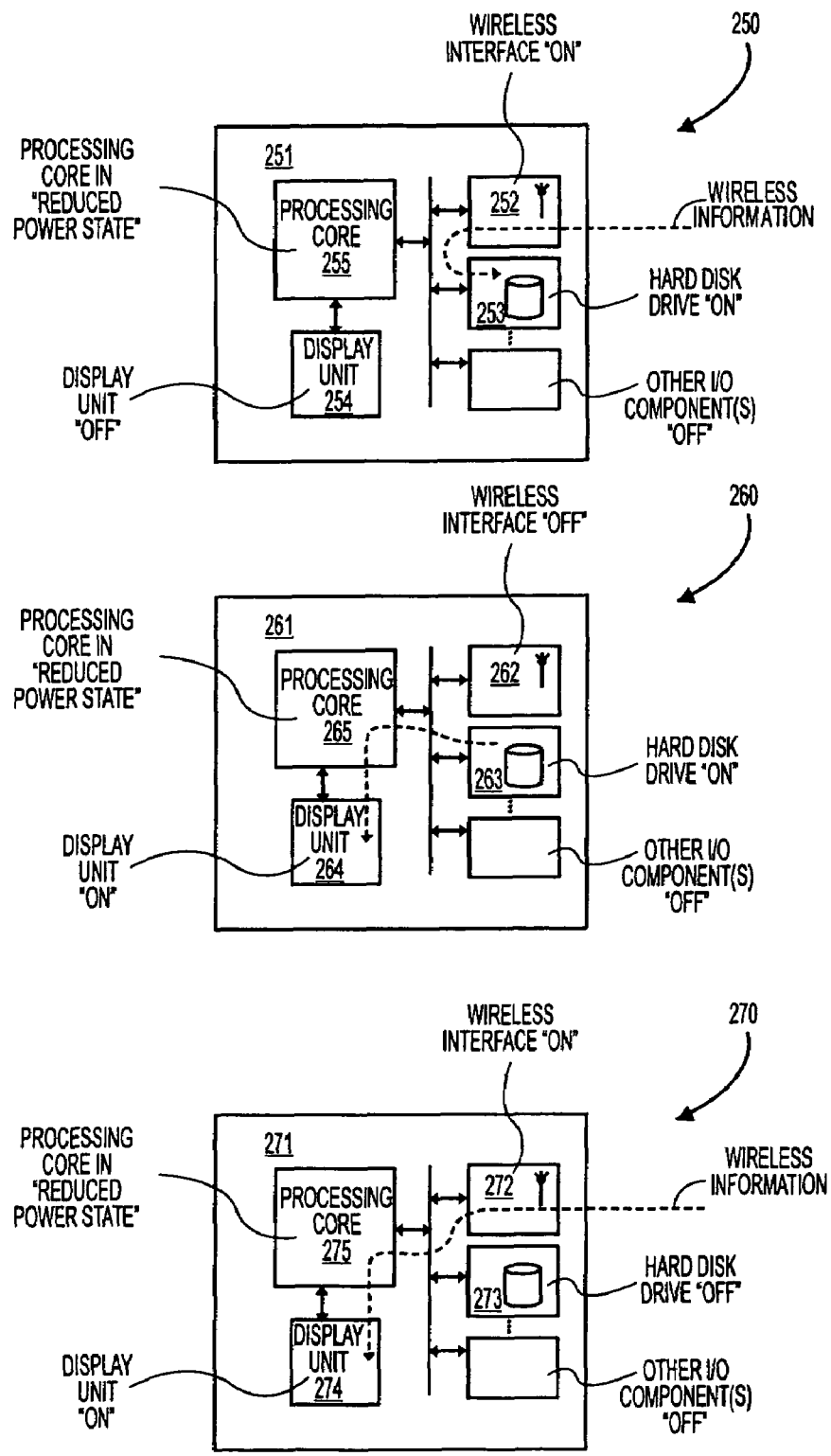
FIG. 2a shows possible applications for a computing system having an active sleep mode.

FIG. 2a shows some possible applications of a computing system that supports a novel state of operation referred to as an "active sleep mode". In active sleep mode, power consumption is conserved as compared to a normal active state; however, some degree of processing power is left available so that that various application software programs may be executed during the active sleep state. An active sleep mode state may be characterized by a computing state that allows for: 1) the wireless reception of information; 2) the storage/retrieval of information from a non volatile storage device (such as a hard disk drive); and/or 3) the displaying of content on a display; wherein, at the same time, one or more components associated with a computing system that operates according to the active sleep mode state are placed in a power conserving state (e.g., by turning one or more of them "off" or in a reduced power consumption state) in order consume power at a rate that is less than when the computing system is operating normally.

The net result is a computing system that: 1) consumes less power as compared to a normal (or "full") operating state; and 2) has the ability to perform useful tasks that are not available with present day reduced power operating states. FIG. 2a shows some possible active sleep mode state examples. According to a first embodiment 250 of an active sleep mode state application, wireless information is received by a computing system 251 through a wireless transceiver unit 252 (which may also be referred to as a wireless interface) and stored to a disk drive 253. Here, the display unit 254 of the computing system 251 is turned off (or otherwise placed in a power conserving state) so that the overall power consumption of the computing system is less than that which would be consumed if the computing system 251 wherein in its normal operating state. Other components associated with the processing core 255 (such as the CPU and/or system memory and/or external cache) may also be placed in a power conserving state as described in more detail below.

Some, possible applications that may make use of this functionality would include an active sleep mode software program that is designed to wirelessly download information from a remote information source (such as a server) while conserving energy as compared to the normal, active state. For example, according to one possible application, active sleep mode software is configured to automatically (e.g., at periodic intervals) check the user's email "inbox" which is located at a remote location. Here, if the user's email "inbox" is located on a server that is coupled to the user's office Local Area Network (LAN); and, the user is away from his/her office with the mobile computing system—the mobile computing system can automatically update the user's incoming email while in a power conserving state.

According to another possible use, the mobile computing system (while in an active sleep mode state) may be configured to automatically download information from the Internet (e.g., the user's personal financial information) from a server having such information (such as a web based on-line brokerage server). According to either of these application examples, the display unit 254 of the computing system 251 of application 250 need not be powered; and, as such, power savings is realized at least because the information is being retrieved and stored with an "off" display unit 254. In alternate embodiments, the display unit 254 may be partially turned on or partially used (e.g., by displaying substantive image content that consumes less than 100% of the screen's display capability) so as to be placed in a reduced power yet usable state. For example, the display may be configured to only display images on 50% or 25% of the screen. That is, the usable window area during reduced power consumption mode is smaller than the usable window area during non power savings mode.

According to a second embodiment 260 of an active sleep mode state application, information is retrieved from a disk drive 263 within a computing system 261 and displayed on the computing system's display unit 264. Here, various peripheral components (such as the wireless transceiver unit 262) is turned off (or otherwise placed in a power conserving state) so as that the overall power consumption of the computing system 261 is less than that which would be consumed if the computing system 261 wherein in its normal operating state. Again, other components associated with the processing core 265 (such as the CPU and/or system memory and/or external cache) may also be placed in a power conserving state as described in more detail below.

The combination of being able to read information from a non volatile memory and then displaying the information on a display allows a user, for example, to enjoy video content (e.g., a movie) that is read from a non volatile storage device (e.g., a CD ROM drive or read/writeable magnetic hard disk drive) and then displayed on the display unit 264. Note that according to this embodiment the display unit may also be utilized in a reduced power state (rather than a fully "on" state) by displaying substantive image content that consumes less than 100% of the screen's display capability.

According to a third embodiment 270 of an active sleep mode application, wireless information is received by a computing system 271 via a wireless interface 272 and displayed on a display unit 274. Here, various peripheral components (such as the hard disk drive unit 273) is turned off (or otherwise placed in a power conserving state) so as that the overall power consumption of the computing system 271 is less than that which would be consumed if the computing system 271 wherein in its normal operating state. Again, other components associated with the processing core 275 (such as the CPU and/or system memory and/or external cache) may also be placed in a power conserving state as described in more detail below.

The combination of being able to wirelessly receive information and then displaying the information on a display allows a user, for example, to enjoy video streaming content (e.g., a video message or conference) from the Internet or other network that the wireless interface 272 is able to receive information from. Note that according to this embodiment the display unit 274 may also be utilized in a reduced power state (rather than a fully "on" state) by displaying substantive image content that consumes less than 100% of the screen's display capability.

The ability to perform these rather sophisticated functions within a reduced power state environment suggests the operability of a lower power computing system that operates during the active sleep mode state; and, a higher power computing system that operates during the normal active mode. The computing system architecture of FIG. 2b demonstrates such an approach. According to the approach of FIG. 2b, a first "high end" or "main" computing system 210 operates during the normal, active state; and, a second "low end" computing system 220 operates during an active sleep mode state. In order to implement these different computing systems 210, 220 some components can be used to support both the active sleep mode and the normal active mode (and, as such, may be activated during both modes) while other components may not support a particular mode (and, as such, may be deactivated during a particular mode).

Figure 2B:
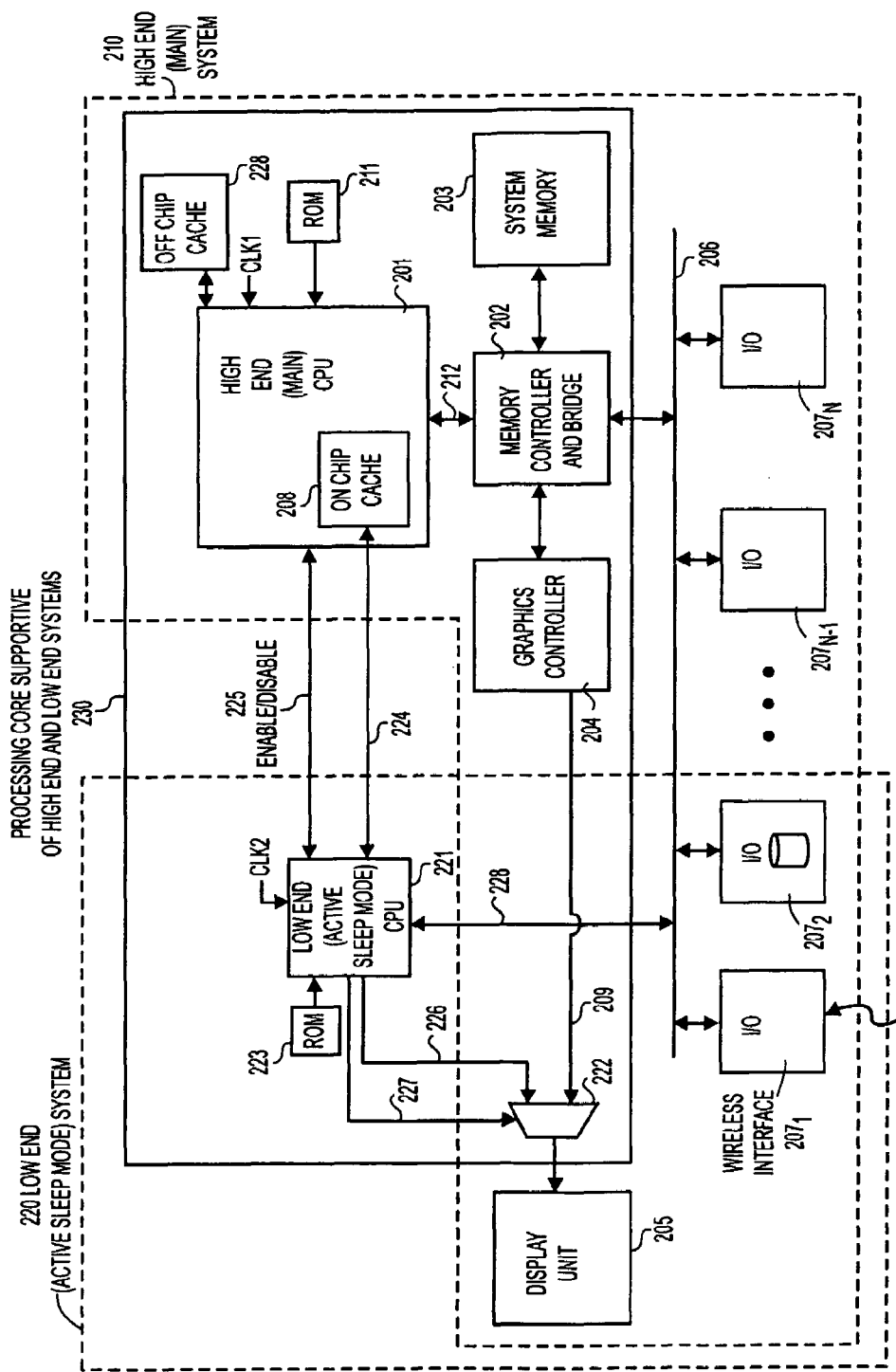
FIG. 2b shows an exemplary computing system architecture that can be used to support an active sleep mode.

FIG. 2b is designed to help envision an embodiment that embraces a computing system capable of implementing a fourth embodiment that differs from those 250, 260, 270 described above in FIG. 2a; or, alternatively, a computing system capable of implementing any of the embodiments 250, 260, 270. In particular, the active sleep mode embodiment supported by the architecture of FIG. 2b allows the display unit 205, the wireless interface $207_1$ and the hard disk drive $207_2$ to be "on" during an active sleep mode. Here, note that any of the embodiments of FIG. 2a can be easily configured by removing one of these items 205, $207_1$ and $207_2$ from the low end system 220 and associating it with the high end system. For example, the first embodiment 251 of FIG. 2a can be implemented by associating the display unit 205 (as well as multiplexer 222, channel select line 227 and display signal lines 226, 209) with the high end system 210 rather than the low end system 220.

Alternatively, if the computing system is to be capable of implementing any of the active sleep mode embodiments 250, 260, 270 of FIG. 2a, the display unit 205 may be configured to be turned "off" during implementation of embodiment 251 yet turned "on" during implementations of embodiments 260, 270. Likewise, the wireless interface unit $207_1$ may be associated with the high end system 210 rather than the low end system 220 (if the system of FIG. 2b is not configured to support embodiments 250 or 270); or, alternatively, the wireless interface unit $207_1$ may be designed to be turned "off" to a reduced power consumption state during implementation of embodiment 260, yet powered "on" and associated with the low end system 220 during implementation of embodiments 250 and/or 270.

Similarly, the hard disk drive unit $207_2$ may be associated with the high end system 210 rather than the low end system 220 (if the system of FIG. 2b is not configured to support embodiments 250 or 260); or, alternatively, the hard disk drive unit $207_2$ may be designed to be turned "off" to a reduced power consumption state during implementation of embodiment 270, yet powered "on" and associated with the low end system 220 during implementation of embodiments 250 and/or 260. As such, the architecture of FIG. 2b may be used as a basis for understanding a wealth of different possible architectural implementations.

The lack of overlap between the main computing system 210 and the active sleep mode computing systems 220 also suggests that the graphics controller 204, memory controller and bridge unit 202, system memory 203, and various other I/O components $207_{N-1}$, $207_N$ are deactivated (so as to be in a lower power state) during the active sleep mode state; and, are activated during the normal active state. Further still, the depiction of FIG. 2 indicates that: 1) a high end CPU 201 is used by the main computing system 210 during the normal active state but it is substantially deactivated (so as to be in a lower power state) during the active sleep mode state; and, 2) a low end CPU 221 is used by the low end computing system 220 during the active sleep mode state but it is substantially deactivated (so as to be in a lower power state) during the normal active mode.

Here, the high end CPU 201 has greater processing power than the low end CPU 221. The processing power of a CPU is typically measured by the number of available instructions (where the availability of more instructions infers greater processing power). As such, in various embodiments, the low end CPU 221 can be envisioned as a "stripped down" version of the high end CPU 201; wherein, the low end CPU 221 includes a set of instructions particularly tailored to the functions that can be performed during the active sleep mode state. Another aspect of CPU processing power is the clock speed of the CPU. Generally, higher clock speed infers higher performance (because more instructions can be performed per unit time) and higher power consumption (because more energy is needed to perform more instructions per unit time) while lower clock speed infers lower performance and reduced power consumption. As such, in various embodiments, the frequency of the clock provided to the high end CPU ("CLK1") may be tailored to be greater than the frequency of the clock provided to the low end CPU ("CLK2").

The reduced processing power of the low end computing system 220 is deemed acceptable because of the reduced functionality associated with the active sleep mode state. Better said, as the active sleep mode state potentially performs (as a whole) less functions as compared to the normal, active state—the software programs that are executed during the active sleep mode state, similarly, consume less memory than the software programs that are executed during the active normal state. The complexity of software is often measured in terms of the amount of memory resources it consumes when stored (e.g., as measured in bytes).

Here, as the software to be executed by a CPU is at least partially stored in a random access memory (RAM), less RAM may be utilized by the low end CPU 221 to execute the software associated with the active sleep mode as compared to the amount of RAM utilized by the high end CPU 201 during the normal, active operating mode. In the particular embodiment of FIG. 2, note that an on chip cache 208 associated with the high end CPU 201 is used as the system memory for the low end computing system 220. Cache is typically implemented with RAM having lower latency (from the perspective of the high end CPU 201) than that associated with the system memory RAM 203.

That is, from the perspective of the high end CPU 201, retrieving information (e.g., data and/or instructions) from cache takes less time than it would take to retrieve the same information from system memory 203. According to standard computing system/CPU designs, cache is used to store frequently used data and/or instructions so that less time is consumed to retrieve them. As a result, the computing system/CPU enjoys improved performance because less time is spent idling while waiting for data and/or instructions. Many modern CPUs (such as those designed by Intel Corporation of Santa Clara, Calif.) employ various levels of cache.

For example, some levels of cache may be "on chip" whereas other levels of cache may be "off chip". On chip cache (such as cache 208) usually has lower latency than off chip cache (such as cache 228) because higher capacitance signal lines (which typically correspond to slower speed signal lines) are associated with off chip interfaces. On chip cache 208 is integrated onto the same semiconductor chip that the logic used to implement the high end CPU 201 is integrated onto; and, off chip cache 228 is a separate semiconductor chip than that used to implement the high end CPU 201. Accordingly, in the embodiment observed in FIG. 2, the low end CPU 221 uses the "on chip" cache 208 of the high end CPU 201 to store the instructions and data that are used to execute the software program(s) that are performed by the low end system 220 during the active sleep mode.

Figure 3A:
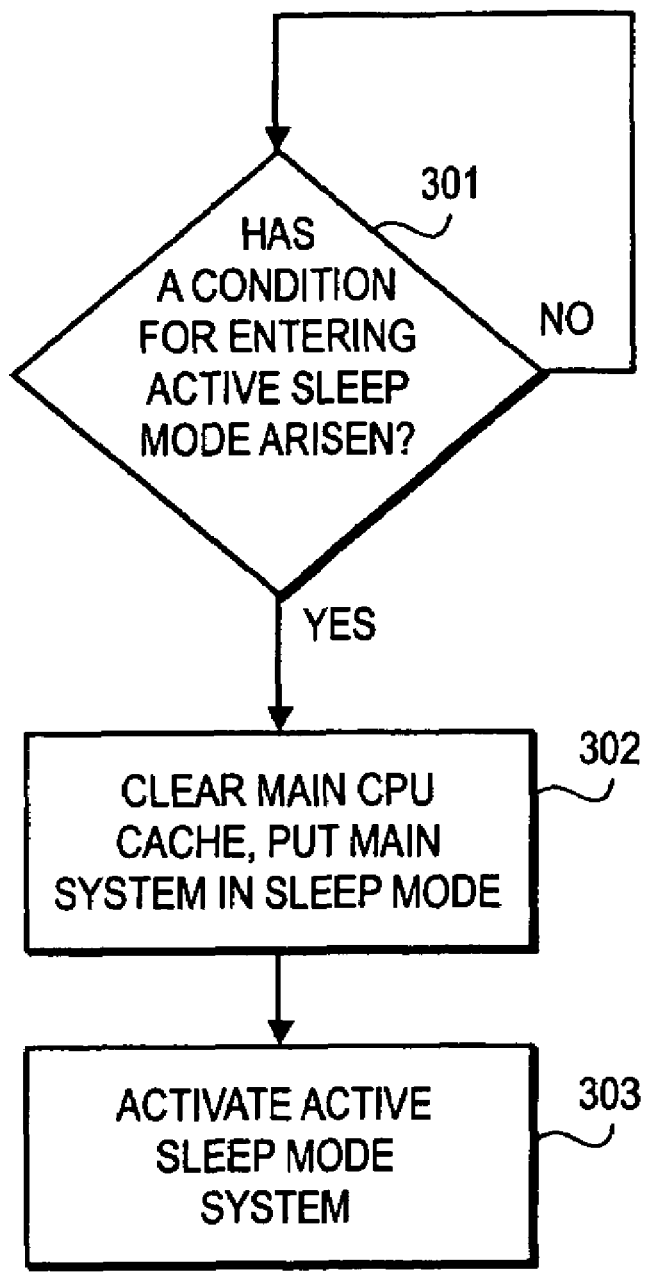
FIG. 3a shows a methodology for entering an active sleep mode state.
Figure 3B:
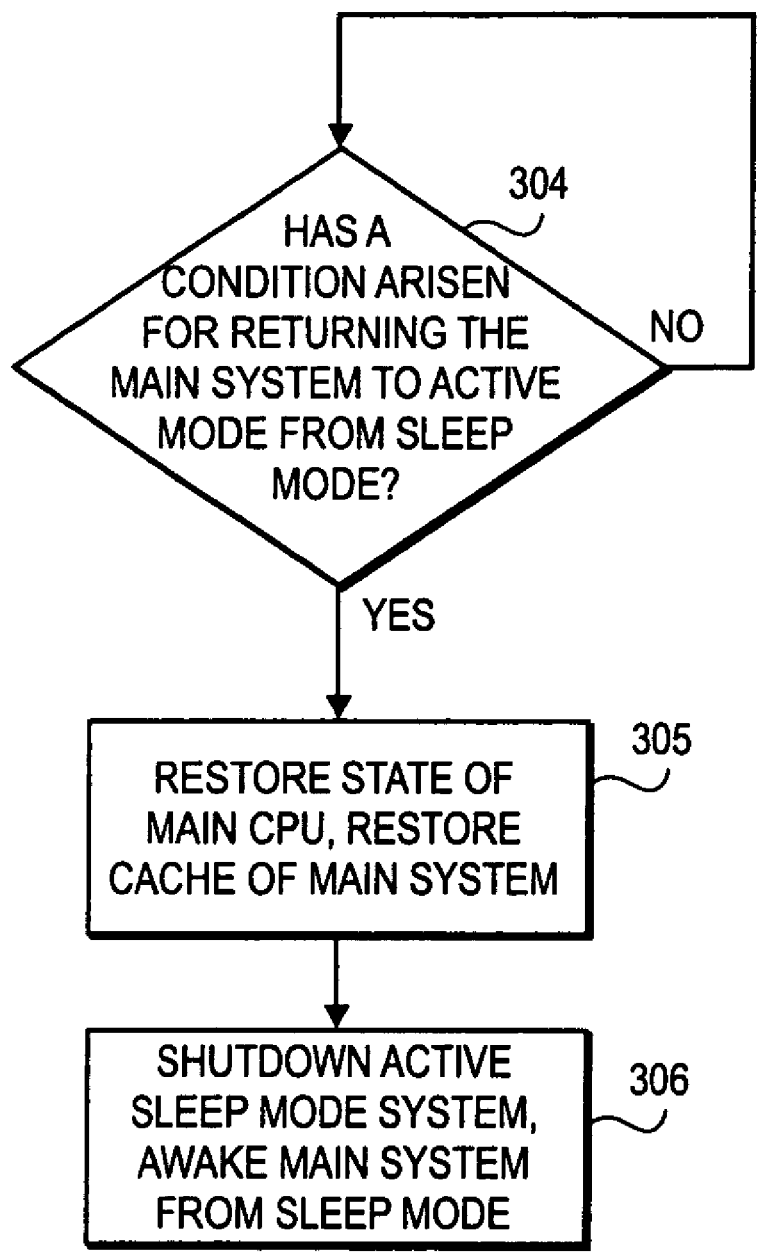
FIG. 3b shows a methodology for returning to a normal active mode from an active sleep mode state.

FIGS. 3a and 3b relate to, respectively, methodologies used for bringing a computing system into and out of active sleep mode. The architecture of FIG. 2b may be viewed as an explore architecture that the methodology of FIG. 3a may be configured to be implemented with. Referring to FIGS. 2b and 3a, when the main computing system 210 is operating in normal active mode, if a condition arises for entering an active sleep mode 301 (e.g., by a user's hitting of a special keypad button (or sequence of keypad button's) or by a user's instruction through a software interface (such as a mouse click on an icon), the main system 210 is put into an "off" state 302. In one embodiment, putting the high end system 210 into "off" state 302 further comprises shutting down the operating system software as is normal when a computing system is powered down.

In another embodiment, putting the high end system 210 into an "off" state further comprises storing the contents of the on chip cache 208, off chip cache 228 and system memory 203 into a non volatile memory (such as hard disk drive 207₂) so that the "state" of the software during the normal operational mode of the system is preserved for instantaneous, subsequent recall. This approach is useful if the user wishes to "bring back" the operating state of the high end system 210 after the active sleep mode state is de-activated (by re-loading the stored state of the software similar to that performed when returning from hibernation mode as previously mentioned in the background section).

In a further embodiment, the user may be given a choice as to whether the high end system 220 software is to be shut down or hibernated (i.e., have its state saved for subsequent recall). Regardless as to whether the high end software is shut down or hibernated, specific hardware elements of the high end system 210 are powered down or otherwise put into a power saving state (e.g., by ceasing application of a clock signal). For example, according to the hardware architectural perspective of FIG. 2b, the off-chip cache 228, ROM 211, memory controller and bridge unit 202, graphics controller 204 and system memory 203 are placed into a power saving state. In alternate architectures, just some of these hardware elements or other hardware elements may be placed into a power saving state (e.g., the display unit, etc.).

Once the high end system 210 is put into an "off" state 302, the low end (active sleep mode) system 220 is brought to life. In an embodiment, the active sleep mode system 220 is brought to life through the activation of an enable signal 225 that is recognized by the low end CPU 221. According to the approach of FIG. 2b, the activation of the enable signal is triggered by the high end CPU 201 (e.g., as a by-product of the high end system being placed into the off state 302). When the low end CPU 221 recognizes that the low end system is to be brought to life, the software to be executed by the low end system 220 during active sleep mode is loaded from a non volatile memory (e.g., a read only memory (ROM)) such as ROM 223 and stored into the on chip cache 208 of the high end CPU 201. After the low end system software is loaded into the on-chip cache 208 and the low end system 220 begins to execute the software, the active sleep mode is activated 303. In alternate embodiments, the software may be stored in a hardwired fashion and recalled from its hardwired state.

According to the active sleep mode state, the on chip cache 208 of the high end CPU 201 is used as the memory base for executing the software that is executed by low end system 220 during the active sleep mode. As such, the on chip cache 208 of the high end CPU 201 stores instructions and data used by the low end CPU 221 to execute the active sleep mode state software. In various instances, as explained in more detail below, the active sleep mode state software may be configured to allow for the execution of a number of tasks (such as receiving information from a wireless interface, storing information to a disk drive, etc.). Once the active sleep mode state has served its purpose, according to at least one embodiment, the computing system may be brought to the normal active state.

FIG. 3b shows a corresponding methodology for transferring from the active sleep mode state to the normal operating state. If a condition arises for entering the normal active mode 304 (e.g., by a user's hitting of a special keypad button (or sequence of keypad button's) or by a user's instruction through a software interface (such as a mouse click on an icon), the low end system 220 is put into an "off" state 305. In one embodiment, putting the low end system 220 into "off" state 305 further comprises shutting down the operating system software as is normal when a computing system is powered down. In another embodiment, putting the low end system 220 into an "off" state 305 further comprises clearing the contents of the on chip cache 208.

Once the low end system 220 is put into an "off" state 305, the main system 210 can be revived 305. In an embodiment, reviving the main system 210 further comprises loading at least a portion of the main system software (e.g., from ROM 211 and/or hard drive 207₂) into the system memory 203. In an embodiment where the state of the main system's 210 software was previously preserved (e.g., by storing the state of the software into the hard disk drive 207₂), the main system may be brought back to life in its previous state by re-installing the saved state information into the main memory and/or off chip and on chip caches 228, 208 (e.g., after reading it from the hard disk drive 207$_2$) as appropriate. In an embodiment where the state is not to be recalled from a previous state and is simply brought up from scratch (e.g., as when it is first powered up), initial code is loaded from ROM 211 and then from the hard disk drive 207$_2$ (as is standard with typical computing system bring-up from an initial power-on state).

Once the main system wakes up and is in a full operative mode a reconciliation process may take place where the main operating system reviews the type of data that is stored or has been transmitted. For stored data, data compression algorithms may be initiated to retrieve and present e-mail, video, etc. For transmitted data, the user may be informed that this action has taken place. This may be done by an applet box on the desktop/background of native operating system.

FIGS. 3a and 3b related to transferring a computing system between a normal active state and an active sleep mode state. FIGS. 4a through 7b illustrate some basic tasks that may be performed during an active sleep mode state. Here, as these tasks can be implemented with software through the coordinated execution of CPU instructions, an active sleep mode system (e.g., such as system 220 of FIG. 2b) can be made to support any, some or all of the operations of FIGS. 4a through 7b through the authoring of appropriately written code; and, the identification of an appropriate low end CPU instruction set. Those of ordinary skill will be able to tailor/identify an appropriate low end CPU instruction set and software routine for each of the basic tasks observed in FIGS. 4a through 7b.

Figure 4A:
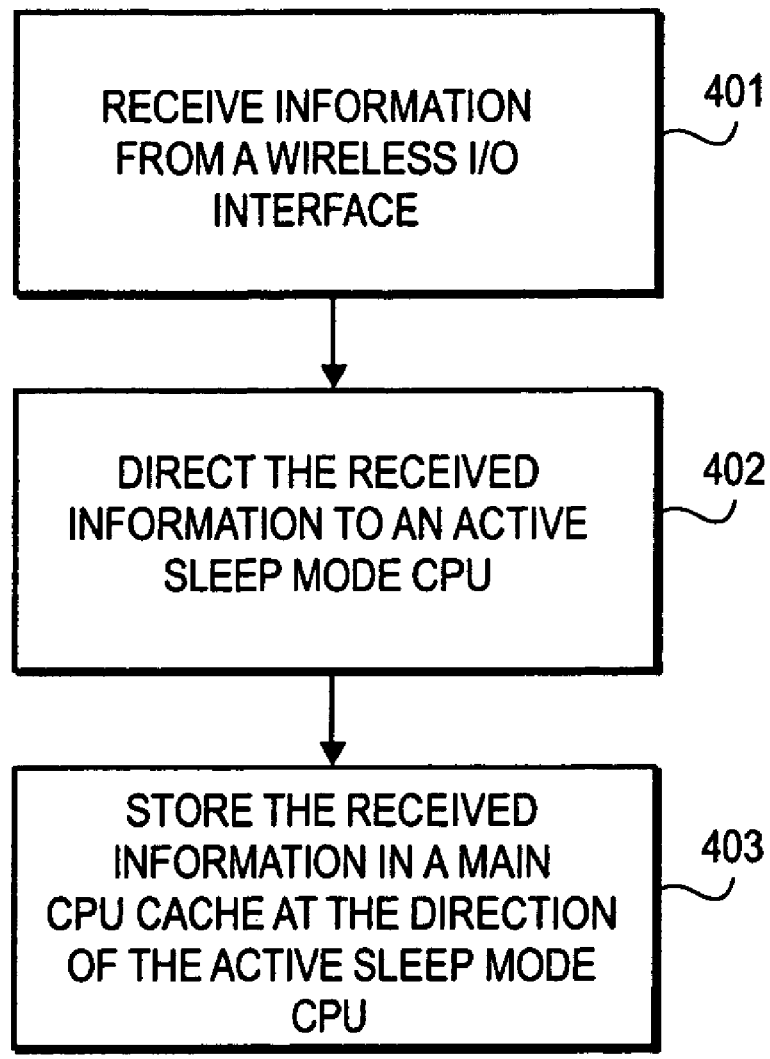
FIG. 4a shows a methodology for receiving wireless information in an active sleep mode state.

Referring then to FIG. 4a (and also referring to FIG. 2b as an exemplary system 220 that the methodology of FIG. 4a can be executed upon), in an active sleep mode state, the applicable software (or the low end CPU 221 without software overview) may be tailored to (in light of the low end CPU's 221 instruction set and or embedded logic functions) receive information from a wireless interface 401. For example by enabling or recognizing the existence of a wireless I/O component 207$_1$ (which may also be referred to as wireless I/O interface 207$_1$); and, understanding or recognizing that the wireless I/O interface 207$_1$ has or will have wirelessly received information (e.g., through some primitive signaling between interface 207$_1$ and low end CPU 221 and/or wireless protocol tasking by the low end CPU 221) or by permitting the wireless I/O interface 207$_1$ to receive wireless information, the software running on the low end CPU 221 (or the low end CPU 221 by itself) can be viewed as an ancillary component to the actual reception of wireless information.

The software running on the low end CPU 221 (or the low end CPU 221 by itself without software overview) can direct or otherwise take part in the transferal of wireless information from the location where it was received (i.e., the wireless I/O interface 207$_1$) to another location where it can be more easily operated on by the low end system (e.g., cache 208). Thus, by directing 402 (e.g., allowing or orchestrating) the transferal of the wirelessly received information from the wireless I/O interface 207$_1$ to the low end CPU 221 (e.g., via bus interface 228); and, by subsequently storing 403 the wirelessly received information into the high end CPU cache 208 (e.g., via cache interface 224), the low end CPU 221 can help re-position wirelessly received information so that it can be more easily used after its reception. Note that the methodology of FIG. 4a may be used to help implement the active sleep mode embodiment 250 of FIG. 2a (if wirelessly received information is cached before it is stored).

Figure 4B:
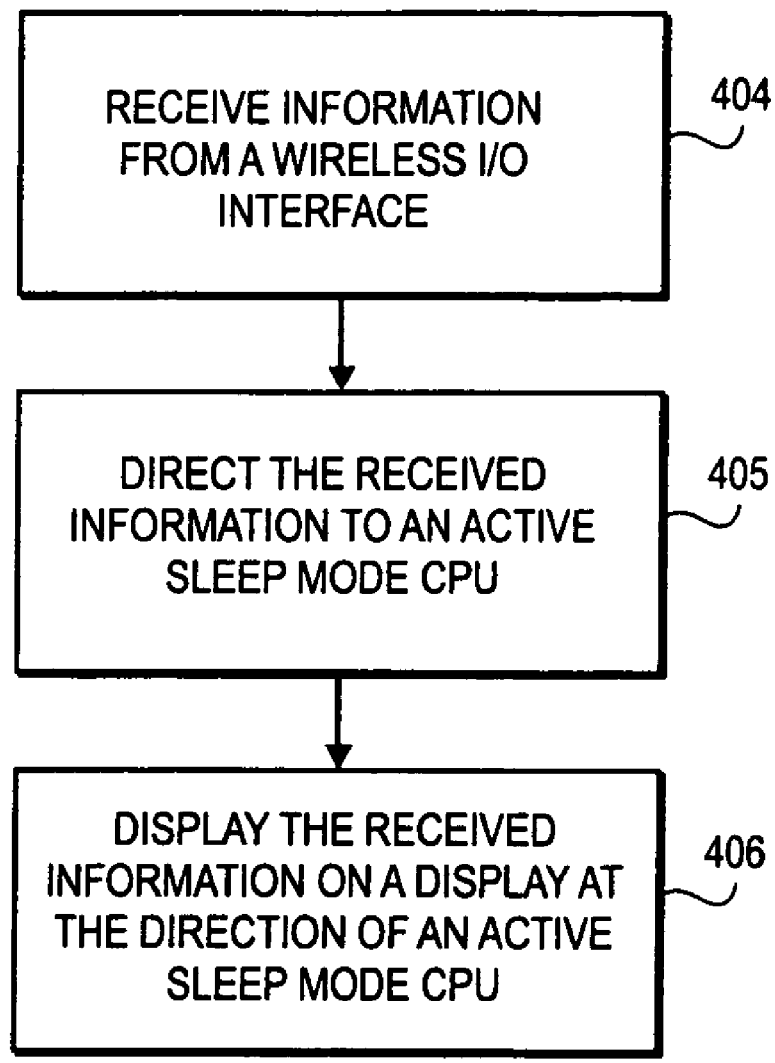
FIG. 4b shows a methodology for receiving and displaying the wireless information in an active sleep mode state.

FIG. 4b shows another exemplary active sleep mode state methodology. Referring to FIG. 4b (and also referring to FIG. 2b as an exemplary system 220 that the methodology of FIG. 4b can be executed upon), in an active sleep mode state, the applicable software (or the low end CPU 221 without software overview) may be tailored to (in light of the low end CPU's 221 instruction set and or embedded logic functions) receive information from a wireless interface 404. Again, by enabling or recognizing the existence of a wireless I/O interface 207$_1$; and, understanding or recognizing that the wireless I/O interface 207$_1$ has or will have wirelessly received information (e.g., through some primitive signaling between interface 207$_1$ and low end CPU 221 and/or wireless protocol tasking by the low end CPU 221) or by permitting the wireless I/O interface 207$_1$ to receive wireless information, the software running on the low end CPU 221 (or the low end CPU 221 by itself) can be viewed as an ancillary component to the actual reception of wireless information.

The software running on the low end CPU 221 (or the low end CPU 221 by itself without software overview) can direct or otherwise take part in the display of wireless information. Thus, for example, by directing 405 (e.g., allowing or orchestrating) the transferal of the wirelessly received information from the wireless I/O interface 207$_1$ to the low end CPU 221 (e.g., via bus interface 228); and, by subsequently displaying 406 the wirelessly received information on the display unit 205 (e.g., by presenting the displayable wirelessly received information along data bus 226 and by selecting data bus 226 via multiplexer 222 channel select line 227), the low end CPU 221 can help display wireless information after its reception. Note that the methodology of FIG. 4b may be used to help implement the active sleep mode embodiment 270 discussed with respect to FIG. 2a.

Figure 4C:
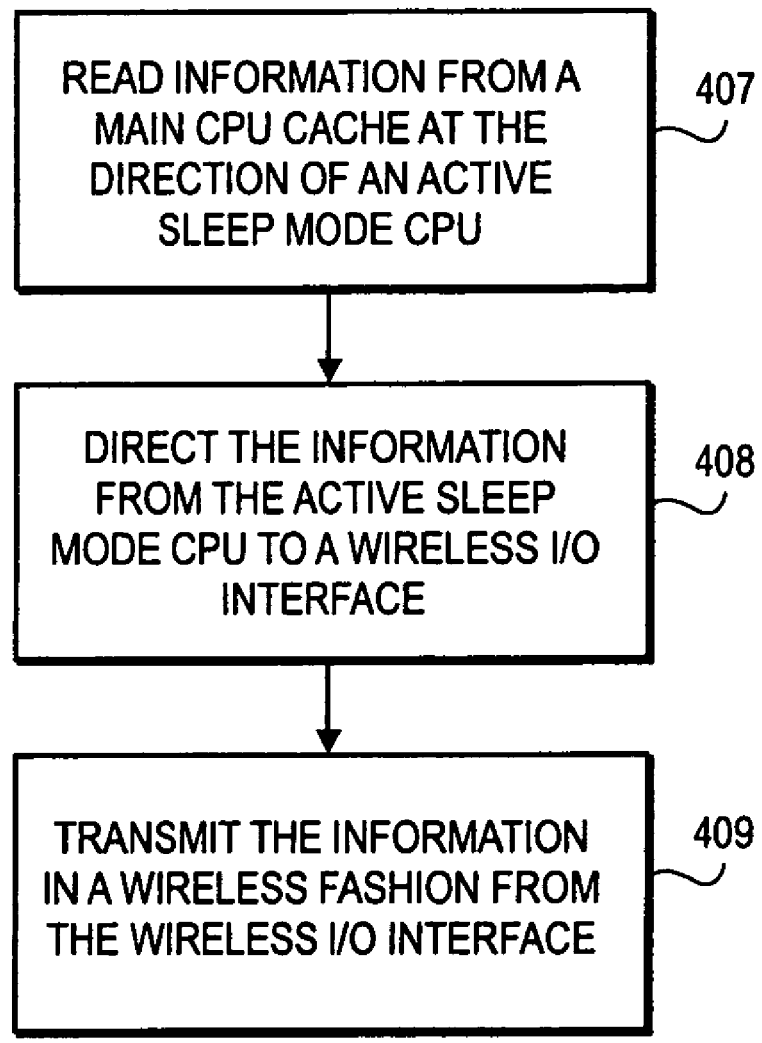
FIG. 4c shows a method for transmitting wireless information in an active sleep mode state.

FIG. 4c relates to an embodiment for transmitting wireless information in an active sleep mode state. Again, the system of FIG. 2b may be viewed as an exemplary system upon which the methodology of FIG. 4c may be executed. According to the methodology of FIG. 4c, information may be read 407 from the high end CPU on chip cache 208 by the low end CPU 221. Then, the information may be forwarded 408 by the low end CPU 221 to a wireless interface 207$_1$ (e.g., via bus interface 228) over a bus 206 that the wireless interface 207$_1$ is coupled to. The wireless interface 207$_1$ then transmits the information over a wireless link, connection, etc. The low end CPU (and its software) may be configured to perform procedural tasks in order to help establish the wireless transmission (such as the execution of wireless communication protocol algorithms).

Figure 5A:
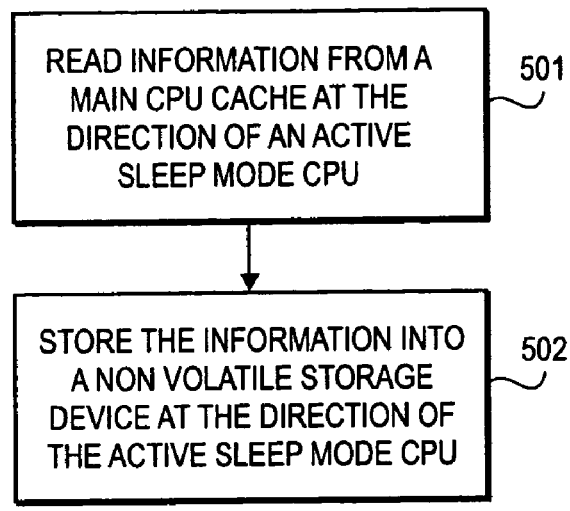
FIG. 5a shows a methodology for transferring information from cache to non volatile memory in an active sleep mode state.
Figure 5B:
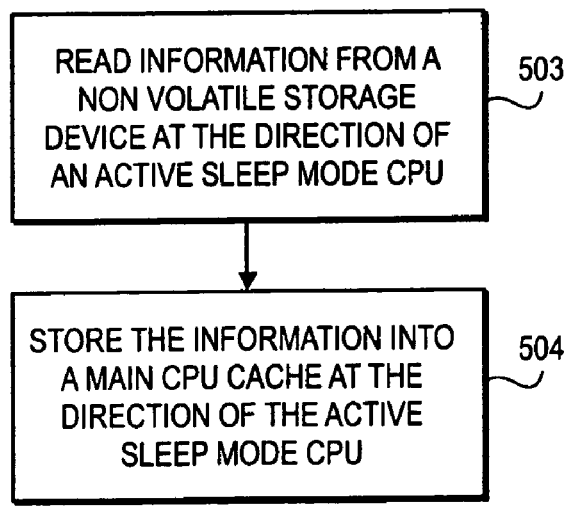
FIG. 5b shows a methodology for transferring information from a non volatile memory to cache in an active sleep mode state.

FIGS. 5a and 5b relate to active sleep mode methodologies that employ a non volatile storage unit for data storage such as the hard disk drive unit 207$_2$ of FIG. 2b. According to the approach of FIG. 5a, information may be read 501 from the high end CPU on chip cache 208 by the low end CPU 221. Then, the information may be forwarded by the low end CPU 221 to a hard disk drive unit 207$_2$ (e.g., via bus interface 228) over a bus 206 that the hard disk drive unit 207$_2$ is coupled to. The information may then be written onto a data storage medium (e.g., a magnetic storage disk) by the hard disk drive unit 207$_2$. The software running on the low end CPU 221 may initiate, control and/or be made aware of the data transfer from the cache 208 to the hard drive unit 207$_2$. Other non volatile memory devices besides magnetic storage may be used such as FLASH memory and/or other types of semiconductor based non volatile data storage technologies.

According to the approach of FIG. 5b, information may be read 503 from a non volatile memory (such as hard disk drive unit 207₂) and then forwarded to a low end CPU 221 (e.g., via bus 206 and bus interface 228). Then, the information may be stored by the low end CPU 221 to the high end CPU on chip cache 208. Again, the software running on the low end CPU 221 may initiate, control and/or be made aware of the data transfer from the non volatile memory 207₂ to the high end CPU on chip cache 208. Note that the methodology of FIG. 5a may be used to help implement the active sleep mode embodiment 250 of FIG. 2a (if information is cached between its being wirelessly received and stored to non volatile memory); and, the methodology of FIG. 5b may be used to help implement the active sleep mode embodiment 260 of FIG. 2a (if the information is cached between its being read from non volatile memory and its being displayed).

Figure 6A:
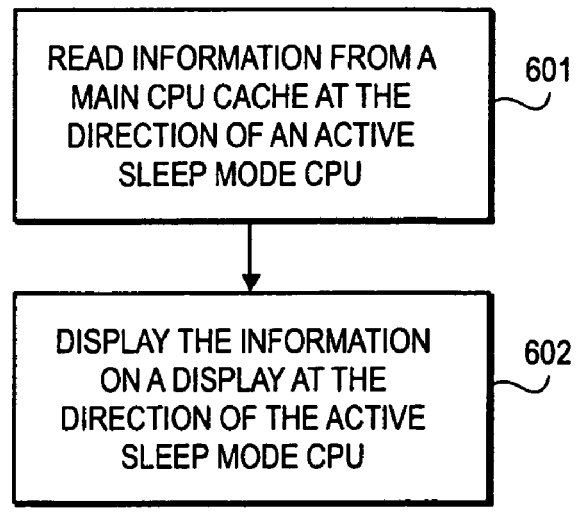
FIG. 6a shows a methodology for displaying information from a cache in an active sleep mode state.
Figure 6B:
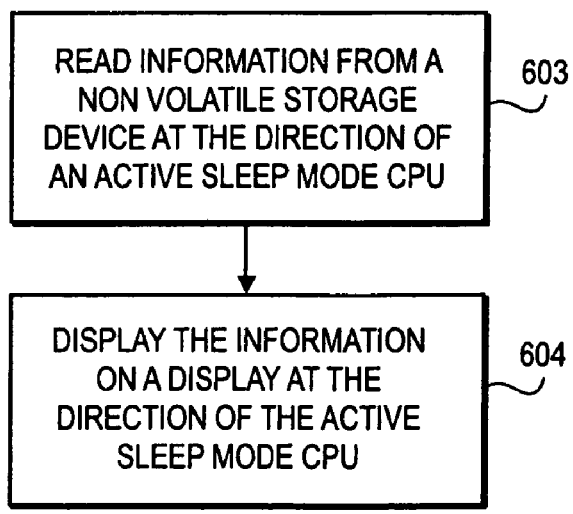
FIG. 6b shows a methodology for displaying information from a non volatile memory in an active sleep mode state.

FIGS. 6a and 6b relate to active sleep mode methodologies that involve displaying information on a display unit such as the display unit 205 of FIG. 2b. According to the approach of FIG. 6a, information may be read 601 from the high end CPU on chip cache 208 by the low end CPU 221. Then, the information may be displayed 602 by the low end CPU 221 on a display unit 205 (e.g., by presenting information read from cache 208 on data bus 226 and applying appropriate control signals to multiplexer 222 at its channel select control line 227). The software running on the low end CPU 221 may initiate, control and/or be made aware of the data transfer from the cache 208 to the display unit 205.

According to the approach of FIG. 6b, information may be read 63 from a non volatile memory (such as hard disk drive unit 207₂) and then displayed 602 by the low end CPU 221 on a display unit 205 (e.g., again, by presenting information read from cache 208 on data bus 226 and applying appropriate control signals to multiplexer 222 at its channel select control line 227). The software running on the low end CPU 221 may initiate, control and/or be made aware of the data transfer from the non volatile memory 207₂ to the display unit 205. Note that the methodology of FIG. 6a may be used to help implement the active sleep mode embodiments 260, 270 (if caching is involved) of FIG. 2a; and, the methodology of FIG. 6b may be used to help implement the active sleep mode embodiment 260 of FIG. 2a.

Figure 7A:
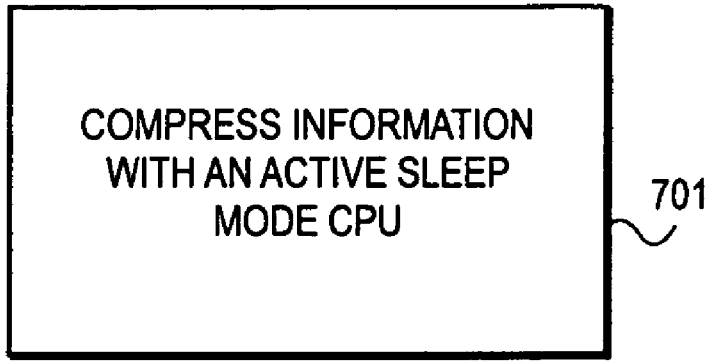
FIG. 7a shows a data compression methodology that can be executed by a low end CPU in an active sleep mode state.
Figure 7B:
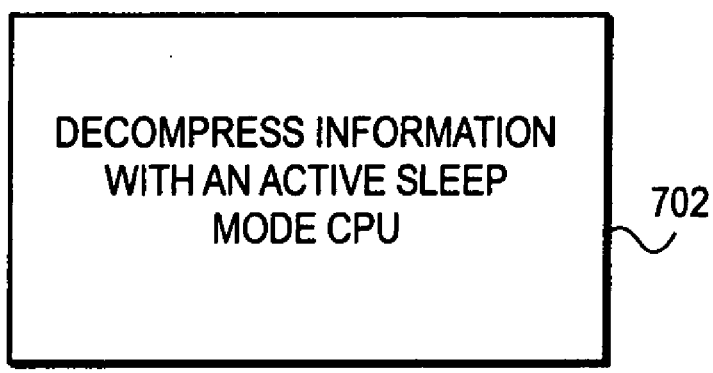
FIG. 7b shows a data decompression methodology that can be executed by a low end CPU in an active sleep mode.

FIGS. 7a and 7b illustrate that the software and/or low end CPU 221 that are executed during the active sleep mode state may also be used to compress or decompress information. Typically voice and/or video information is compressed prior to transmission over a network; and, decompressed after reception from a network. Compression/decompression may also come into play when information is stored to a non volatile storage device (such as hard drive 207₂). For example, a data file may be compressed prior to its storage and decompressed after its retrieval. In the former case, the compression/decompression activity helps conserve network resources while in the later case the compression/decompression activity helps conserve data storage resources. The methodologies of FIGS. 7a and 7b may be mixed with any of the methodologies of FIGS. 4a through 6b as appropriate consistent with the guidelines expressed just above.

For example, the methodology 702 of FIG. 7b may follow the methodology 403 of FIG. 4a in order to decompress wireless information after it has been received in an active sleep mode. Similarly, the methodology 701 of FIG. 7a may precede the methodology 407 of FIG. 4c in order to compress information prior to is being wirelessly transmitted in an active sleep mode. Likewise, the methodology 701 of FIG. 7a may precede the methodology 501 of FIG. 5a in order to compress information prior to its storage in non volatile memory in an active sleep mode; and, the methodology 702 of FIG. 7b may follow methodology 504 of FIG. 5b in order to decompress information after its retrieval from a non volatile memory in an active sleep mode.

Figure 8:
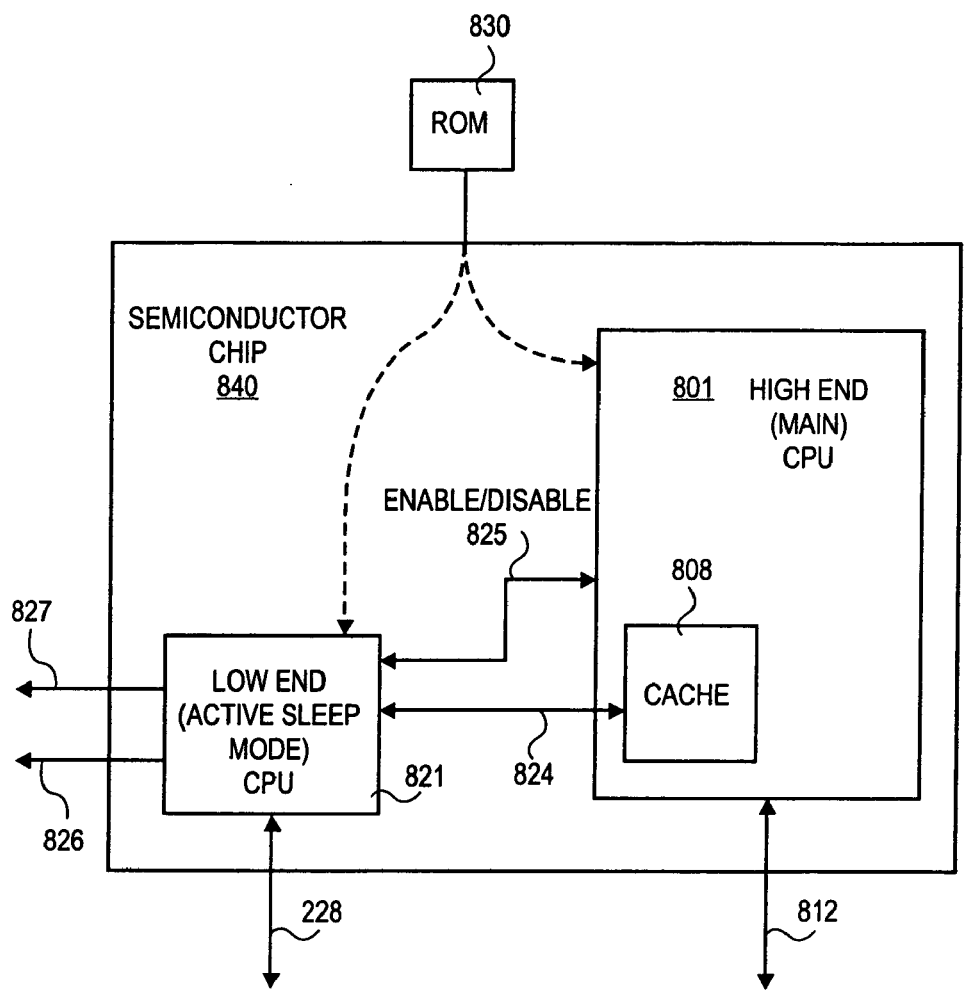
FIG. 8 shows a first CPU semiconductor chip architecture that supports an active sleep mode.
Figure 9:
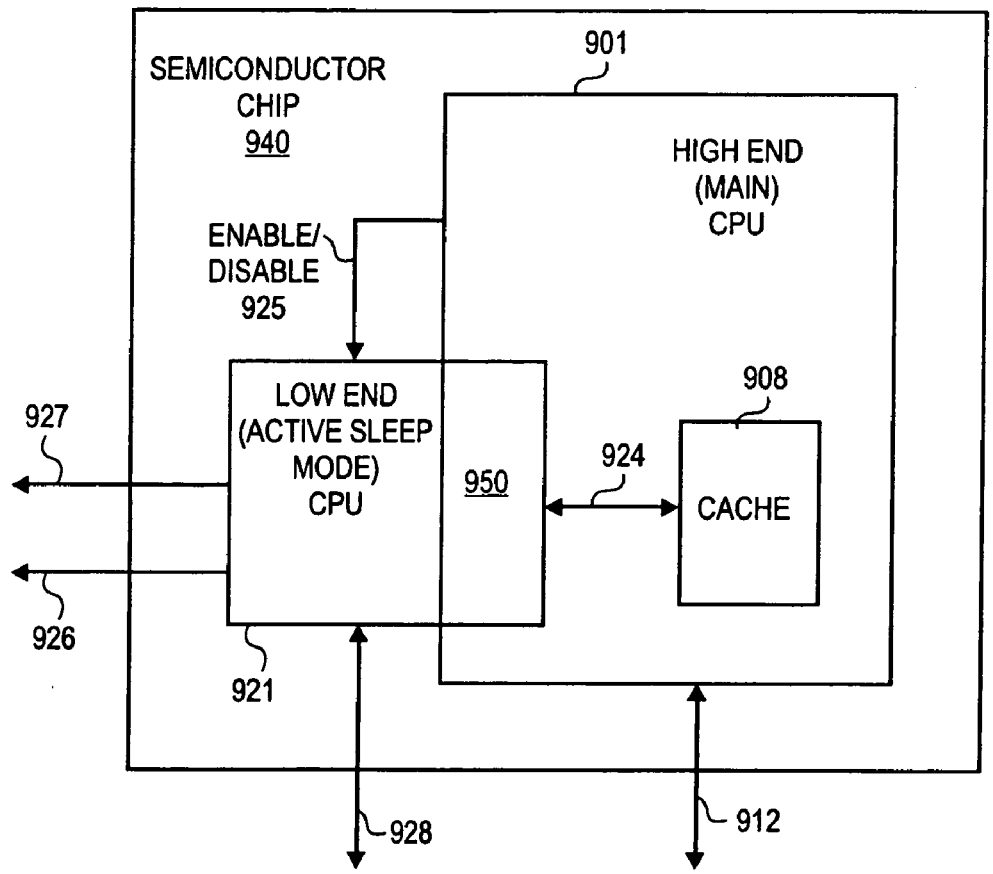
FIG. 9 shows a second CPU semiconductor chip architecture that supports an active sleep mode.

FIGS. 8 and 9 relate to some CPU embodiments that may be used to implement both high end and low end CPU functions. According to the approach of FIG. 8, the logic designs used to implement the instruction sets for the low end and high end modes are kept separate from one another. As such, two different CPUs 801, 821 (e.g., as suggested by FIG. 2b) are actually implemented. Thus, the high end CPU 801 controls the operation of the computing system during the normal operational mode while the low end CPU 821 controls the operation of the system during the active sleep mode. The low end CPU 821 uses the on chip cache 808 of the high end CPU 801 as a system memory during operation of the active sleep mode.

Furthermore, an active sleep mode interface 828 is used to transfer information between the I/O components that are kept alive during active sleep mode (e.g., wireless transceiver, hard disk drive, etc.) and the low end CPU during the active sleep mode state. An embodiment of an active sleep mode interface 228 is first observed in FIG. 2b. The low end CPU may also include signal lines that are sufficient to control a display unit during the active sleep mode (such as a multiplexer channel select 827 and a display information data bus 826). Embodiments of a multiplexer channel select line 827 and a display information data bus 826 were first observed in FIG. 2b as line 227 and data bus 226, respectively. Note that even though two separate CPUs 801, 821 are employed; nevertheless, the two different CPUs may be integrated onto the same semiconductor chip 840.

A ROM 830 may be used to supply the initial code to a particular CPU when it is to be brought to an active state. That is, ROM 830 may be direct initial code to the high end CPU 801 whenever the high end system is to be brought to a normal active state; and, may also direct initial code to the low end CPU 821 whenever the active sleep mode is to be brought to life. Triggering between the normal active and active sleep mode states may be accomplished via enable/disable line 825 (e.g., as discussed with respect to FIGS. 3a and 3b). Data bus 824 is used to help the low end CPU 821 utilize the on chip CPU cache 808 during the active sleep mode state.

FIG. 9 illustrates an architecture for an alternative where the circuitry used to implement the normal active state and the active sleep mode are, at least to some degree, shared. As such, rather than separate CPUs (as observed in FIG. 8), there is some degree of overlap between the high end and low end CPUs 901, 921. According to the depiction of FIG. 9, portion 950 represents that portion which is shared. Note that the depiction of FIG. 9 allows for embodiments where circuitry may be left solely for the normal active state (such as the portion of the high end CPU 901 that is not associated with portion 950); and, where circuitry may also be left solely for the active sleep mode (such as the portion of the low end CPU 921 that is not associated with portion 950).

An embodiment of approach that conforms to the approach of FIG. 9 would include a CPU having a lower power active sleep mode state that "shuts down" various functional units associated with the high end CPU (while keeping alive various other functional units) so that a scaled down, lower power CPU is left operational during the active sleep mode state. Here, the scaled down, lower power CPU should have sufficient processing power so that any, some or all of the embodiments 250, 260, 270 of FIG. 2a and/or the methodologies of FIGS. 4a through 7b are possible.

Again, the on chip cache 908 is used as the system memory for the active sleep mode state. An active sleep mode interface 928 to communicate with I/O components in active sleep mode and a normal active interface 912 (e.g. front side bus) to communicate with I/O components during normal active mode may be kept separate (as observed in FIG. 9); or, alternatively may be merged to at least some degree. Separate control/data lines 927, 928 for displaying information during the active sleep mode state may be associated with the low CPU portion 921. Again the circuitry for implementing the low end and high end CPUs 921, 901 may be integrated onto the same semiconductor chip 940.

Thus, It is to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   (a) transitioning a computing system from a normal active mode to an active sleep mode, said transitioning comprising:
      storing active sleep mode software instructions to be executed by a low end central processing unit into an on chip cache that cached normal active mode software instructions that were executed by a high end central processing unit during said normal active mode, said active sleep mode software instructions to be executed by said low end central processing unit during said active sleep mode, said computing system consuming less power during said active sleep mode than during said normal active mode;
      placing a graphics controller into a low power state in which said graphics controller will not perform graphics processing tasks in said active sleep mode that it performed in said normal active mode; and
   (b) during said active sleep mode:
      executing at least a portion of said active sleep mode instructions in order to wirelessly receive information;
      transferring said information from a wireless interface to said on chip cache;
      executing at least a second portion of said active sleep mode instructions in order to compress said information before it is stored externally from said cache.

2. The method in claim 1 further comprising executing at least a third portion of said active sleep mode instructions in order to decompress said information after it has been said stored.

3. The method in claim 1 wherein said information is said stored in a non volatile storage device.

4. The method in claim 3 wherein said non volatile storage device is a magnetic hard disk drive.

5. The method in claim 3 wherein said non volatile storage device is a FLASH memory.

6. The method in claim 1 further comprising executing at least a fourth portion of said active sleep mode instructions in order to display said information on a display unit.

7. A method, comprising:
   (a) transitioning a computing system from a normal active mode to an active sleep mode, said transitioning comprising:
      storing active sleep mode software instructions to be executed by a low end central processing unit into an on chip cache that cached normal active mode software instructions that were executed by a high end central processing unit during said normal active mode, said active sleep mode software instructions to be executed by said low end central processing unit during said active sleep mode, said computing system consuming less power during said active sleep mode than during said normal active mode;
      placing a graphics controller into a low power state in which said graphics controller will not perform graphics processing tasks in said active sleep mode that it performed in said normal active mode; and
   (b) during said active sleep mode:
      executing at least a portion of said active sleep mode instructions in order to wirelessly receive information;
      transferring said information from a wireless interface to said on chip cache;
      transferring said information from said on chip cache to a non volatile storage device.

8. The method in claim 7 further comprising executing at least a second portion of said active sleep mode instructions in order to decompress said information after it has been said received.

9. The method in claim 7 further comprising executing at least a second portion of said active sleep mode instructions in order to compress said information before it is stored to said non volatile storage device.

10. The method in claim 9 wherein said non volatile storage device is a magnetic hard disk drive.

11. The method in claim 9 wherein said non volatile storage device is a FLASH memory.

12. The method in claim 7 further comprising executing at least a third portion of said active sleep mode instructions in order to display information on a display unit.

13. The method in claim 7 wherein said non volatile storage device is a magnetic hard disk drive.

14. The method in claim 7 wherein said non volatile storage device is a FLASH memory.

* * * * *